Dec. 26, 1950     E. ADAMCZYK     2,535,185
LAWN MOWER REEL
Filed Nov. 14, 1949
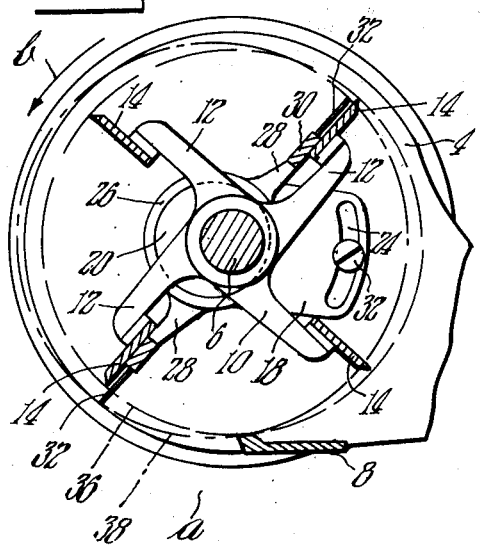
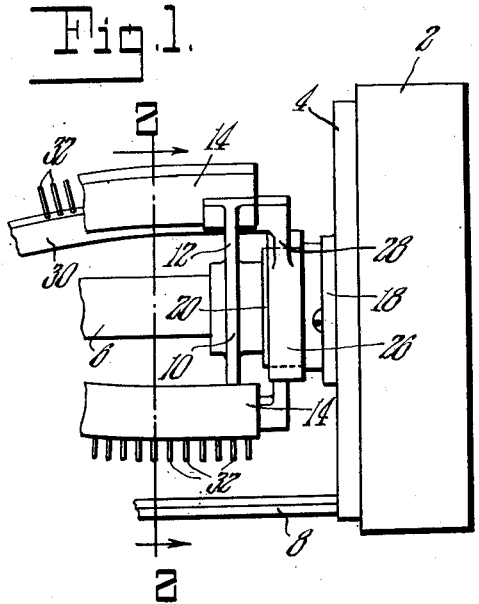
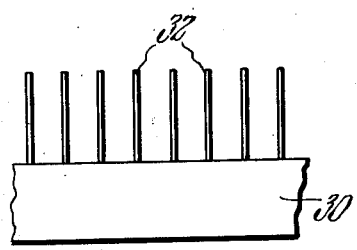
INVENTOR.
Edward Adamczyk
BY Ross & Ross
ATTORNEY'S

Patented Dec. 26, 1950

2,535,185

UNITED STATES PATENT OFFICE 2,535,185

LAWN MOWER REEL

Edward Adamczyk, Indian Orchard, Mass.

Application November 14, 1949, Serial No. 127,149

1 Claim. (Cl. 56—294)

This invention relates to improvements in lawn mowers and is directed more particularly to the provision of means for presenting grass to be cut to the cutting elements of a lawn mower.

The principal objects of the invention are the provision of means in combination with the rotating blades of a lawn mower for engaging and presenting the grass to be cut to the cutting elements.

A lawn mower having longitudinal cutter bars arranged helically for coacting with a stationary blade is not efficient for the reason that the bars are rotated at such high speed that they tend to present a smooth cylinder to the grass so as to smooth it down without cutting.

According to this invention, means rotated by the cutter bars and in advance thereof, is adapted to engage and pick up the gears and position it for the action of the rotating and stationary cutters.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Fig. 1 is a front elevational view of one end of a conventional lawn mower having the novel features of the invention associated therewith;

Fig. 2 is a sectional elevational view on the line 2—2 of Fig. 1; and

Fig. 3 is a side elevational view of a portion of one of the combs of the invention.

Referring now to the drawings more in detail, the invention will be fully described.

A wheel of a lawn mower is represented by 2, there being two such wheels, one at either end of the lawn mower.

Frames such as 4 are located at opposite ends of the lawn mower in which a longitudinal shaft 6 is rotatable.

Engageable gears, not shown, between the end frames and wheels and connecting the wheels and shaft operate to rotate the shaft 6 as the lawn mower is rolled on the wheels along the ground.

A stationary cutter bar 8 extends between the frames 6. End spiders 10 are secured to the shaft 6 in spaced relation.

These spiders 10 have radially extending arms 12 and longitudinally extending cutters 14 have opposite ends secured to outer ends of the arms. The bars are formed to extend spirally from one end to the other and as the shaft 6 is rotated they cooperate with the cutter bar with a shearing action and cut the grass which the bars 14 pick up as the machine is moved in the direction of arrow $a$ in Fig. 2.

As the lawn mower moves forwardly, the shaft and cutters are rotated at relatively high speed so that the cutting edges of the cutters in effect present a smooth cylinder and pick up and cut a small percentage of the grass. In fact, the cutters tend to lay a large percentage of the grass down and this is overcome by means of my invention.

Brackets such as 18 are provided adjacent each end frame 4 in which the shaft 6 is rotatable or are oscillatable on the shaft as may be desired.

The brackets 18 are provided with cylindrical journals 20 which extend inwardly towards one another. The longitudinal axes of the journals 20 are offset at a side of the longitudinal axis of the shaft 6 so that they are eccentrically related to said shaft.

The brackets 18 are oscillatable relative to the shaft 6 so that the longitudinal axis of the journals 20 may be moved relative to the axis of shaft 6 to position the axis of the journals relative to the axis of the shaft.

The brackets may be secured in adjusted positions by any suitable means such as screws 22 in threaded engagement with the end frames 4 which extend through slots 24 in said brackets.

Spiders 26 are rotatable on the journals and have radially extending arms 28. Longitudinal comb bars 30 have opposite ends secured to outer ends of arms 28 and are formed similarly to the cutter bars 14.

These comb bars 30 are disposed to be engaged and propelled by the cutter bars as they rotate in the direction of arrow $b$, Fig. 2.

The comb bars may carry outwardly projecting pins or teeth 32. If desired, said comb bars may be formed or provided with any other desired means adapted to engage and elevate the grass forwardly of the cutter bar 8.

In Fig. 2 the path of circular movement of the cutters 14 is represented by the dash line 36 while the circular path of circular movement of the teeth 32 is shown by the dot-dash line 38.

As the cutters 14 are rotated in the direction of arrow $b$, the comb bars are propelled and rotated thereby in advance thereof so that the teeth of the comb bars engage and pick up the grass in advance of the cutters for the coaction of said cutters and cutter bar 8.

As stated, the brackets 18 may be adjusted to vary the eccentricity of the cutters and combs and has been found to be desirable to meet varying conditions such as types, lengths, etc.

While there are two combs shown in combination with four cutters 14 there may be more or less as may be desired, it being intended that one or more combs be propelled by the rotating cutters.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

The combination with the longitudinal stationary cutter bar and rotatable shaft extending from the end frame of a lawn mower having a spider fixed on said shaft provided with radial arms having elongated rotatable spiral cutter bars thereon with means for engaging grass and the like for the cooperative action of said cutter bars and stationary bar comprising, a bracket oscillatable on said shaft adjacent said end frame, means for securing said bracket to said frame in adjusted position, said bracket provided with a cylindrical journal on an inner side thereof having a longitudinal axis disposed parallel to and at a side of the longitudinal axis of said shaft, a comb bar spider freely rotatable on said journal having radially extending arms, elongated comb bars having ends thereof fixed against movement to outer portions of the arms of the comb bar spider for engagement by said rotatable cutter bars and provided with outwardly extending projections along outer longitudinal edges thereof, said comb bar spider and arm thereof being unconnected to the cutter bar spider and arms for relative movements of said comb bar and cutter bar spiders on their respective axes and movement of said comb bars between and towards and away from said rotatable cutter bars, all adapted and arranged whereby as the said rotatable cutters bars are rotated by said shaft and cutter bar spider said comb bars are engaged and rotated by and in contact with said cutter bars.

EDWARD ADAMCZYK.

REFERENCES CITED

The following references are of record in the file of this patent:

UNITED STATES PATENTS

| Number | Name | Date |
| --- | --- | --- |
| 2,056,369 | Roessel | Oct. 6, 1936 |